(12) United States Patent
Rhyu et al.

(10) Patent No.: US 9,628,534 B2
(45) Date of Patent: Apr. 18, 2017

(54) METHOD AND APPARATUS FOR TRANSMITTING AND RECEIVING ADAPTIVE STREAMING MECHANISM-BASED CONTENT

(71) Applicant: Samsung Electronics Co., Ltd., Gyeonggi-do (KR)

(72) Inventors: Sung-Ryeul Rhyu, Gyeonggi-do (KR); Seo-Young Hwang, Gyeonggi-do (KR); Jae-Yeon Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/739,750

(22) Filed: Jun. 15, 2015

(65) Prior Publication Data

US 2015/0334147 A1 Nov. 19, 2015

Related U.S. Application Data

(63) Continuation of application No. 13/186,992, filed on Jul. 20, 2011, now Pat. No. 9,060,185.

(30) Foreign Application Priority Data

| Jul. 20, 2010 | (KR) | 10-2010-0070225 |
| Jul. 28, 2010 | (KR) | 10-2010-0073096 |
| Oct. 7, 2010 | (KR) | 10-2010-0097815 |

(51) Int. Cl.

| G06F 15/16 | (2006.01) |
| H04L 29/06 | (2006.01) |
| H04N 21/2343 | (2011.01) |
| H04N 21/845 | (2011.01) |
| H04N 21/643 | (2011.01) |

(52) U.S. Cl.
CPC ........ *H04L 65/601* (2013.01); *H04L 65/4069* (2013.01); *H04N 21/23439* (2013.01); *H04N 21/64322* (2013.01); *H04N 21/8456* (2013.01)

(58) Field of Classification Search
CPC ..................... H04N 21/23439; H04N 21/8456
USPC ................................. 709/217–219, 231–232
See application file for complete search history.

(56) References Cited

U.S. PATENT DOCUMENTS

| 7,412,533 B1 | 8/2008 | Johnson et al. |
| 7,451,229 B2 | 11/2008 | Klemets et al. |
| 8,050,203 B2 | 11/2011 | Jacobsen et al. |
| 9,131,027 B2* | 9/2015 | Zhang ..................... H04L 65/60 |

(Continued)

FOREIGN PATENT DOCUMENTS

| KR | 10-2008-0016635 | 2/2008 |
| WO | WO 2009/024926 | 2/2009 |

OTHER PUBLICATIONS

3rd Generation Partnership Project; Technical Specification Group Services and System Aspects Transparent End-to-End Packet-Switched Streaming Service (PSS).

(Continued)

*Primary Examiner* — Bharat N Barot
(74) *Attorney, Agent, or Firm* — The Farrell Law Firm, P.C.

(57) ABSTRACT

Methods and apparatus are provided for transmitting adaptive streaming mechanism-based content. Representations, which include content components, are combined into a group. At least two of the group, a representation, and a content component type are combined into a subset. The subset is transmitted.

4 Claims, 4 Drawing Sheets

(56) References Cited

U.S. PATENT DOCUMENTS

| | | | |
|---|---|---|---|
| 2004/0223513 A1 | 11/2004 | Meago | |
| 2006/0015580 A1 | 1/2006 | Gabriel et al. | |
| 2007/0002871 A1 | 1/2007 | Pekonen et al. | |
| 2008/0133766 A1 | 6/2008 | Luo | |
| 2008/0313351 A1* | 12/2008 | Mobasser | H04L 65/4076 709/241 |
| 2010/0223394 A1 | 9/2010 | Sherer et al. | |
| 2011/0219138 A1 | 9/2011 | Cho et al. | |
| 2011/0265135 A1* | 10/2011 | Liwerant | H04M 3/567 725/112 |
| 2012/0023251 A1 | 1/2012 | Pyle et al. | |
| 2013/0254418 A1* | 9/2013 | Zhang | H04L 65/60 709/231 |

OTHER PUBLICATIONS

HTTP-based Streaming and Download (HSD) (Release 10), 3GPP TS 26.cde V0.0.3, Jun. 2010, 34 pages.
European Search Report dated Jul. 5, 2016 issued in counterpart application No. 11809862.3-1908, 5 pages.

* cited by examiner

METHOD AND APPARATUS FOR TRANSMITTING AND RECEIVING ADAPTIVE STREAMING MECHANISM-BASED CONTENT

PRIORITY

This application is a continuation of U.S. patent application Ser. No. 13/186,992, which was filed on Jul. 20, 2011, now U.S. Pat. No. 9,060,185, which claims priority under 35 U.S.C. §119(a) to a Korean Patent Application filed in the Korean Intellectual Property Office on Jul. 20, 2010 and assigned Serial No. 10-2010-0070225, a Korean Patent Application filed in the Korean Intellectual Property Office on Jul. 28, 2010 and assigned Serial No. 10-2010-0073096, and a Korean Patent Application filed in the Korean Intellectual Property Office on Oct. 7, 2010 and assigned Serial No. 10-2010-0097815, the entire disclosures of which are incorporated herein by reference.

BACKGROUND OF THE INVENTION

Field of the Invention

The present invention relates generally to an adaptive streaming service, and more particularly, to a method and apparatus for transmitting and receiving broadcast content using an adaptive streaming service.

Description of the Related Art

Recently, due to an increase in the use of on-line content, the importance of seamless content delivery has increased significantly. More attention is now concentrated on adaptive streaming technology in which a bit rate of content is smoothly or adaptively changed during its delivery depending on the change in available transmission bandwidth and/or performance of a user device. This adaptive streaming technology optimizes the bit rate by analyzing the network environment of the user. Multiple standards organizations have discussed new transmission technology like the adaptive streaming, in which a user terminal selects unit content, segmented into small pieces based on a Hyper Text Transfer Protocol (HTTP), and plays it depending on the situation, allowing its user to enjoy the content seamlessly and without delay.

Internet Protocol (IP)-based convergence of telecommunications and broadcasting, which is a marketable new next-generation business model, has attracted attention as one of the next-generation market-leading technologies. Particularly, Internet Protocol Television (IPTV), the largest pillar of Convergence of Broadcasting and Mobile Service (CBMS), is technology that can provide new services by recombining or combining the existing TV, voice, and data technologies. IPTV can also support interactive features, making it possible to create a variety of business models and services. Compared with the existing service provision technology specialized for limited terminal environments, this IPTV technology may provide its services to fixed-type terminals, such as set-top boxes, PCs, and TVs, and mobile-type terminals, such as cell phones and Personal Digital Assistants (PDAs) in both a wired network and a wireless network (or a broadcast network) regardless of the network type. Thus, it may be possible to provide and apply the same services in various different environments and enabling the service providers to develop a variety of new services taking various environments into consideration.

SUMMARY OF THE INVENTION

The present invention has been made to address at least the above problems and/or disadvantages and to provide at least the advantages described below. Accordingly, an aspect of the present invention provides a method and apparatus for transmitting and receiving adaptive streaming mechanism-based broadcast content in a digital broadcasting system.

According to one aspect of the present invention, a method is provided for transmitting adaptive streaming mechanism-based content. Representations that include content components are combined into a group. At least two of the group, a representation, and a content component type are combined into a subset. The subset is transmitted.

According to another aspect of the present invention, an apparatus is provided for transmitting adaptive streaming mechanism-based content. The apparatus includes a controller for combining representations, which include content components, into a group, and combining at least two of the group, a representation, and a content component type into a subset. The apparatus also includes a transmitter for transmitting the subset.

According to an additional aspect of the present invention, a method is provided for receiving adaptive streaming mechanism-based content. A subset is received. The subset is configured by combining representations, which include content components, into a group and combining at least two of the group, a representation, and a content component type into the subset. At least one of a desired representation, a desired group, and a desired content component type is selected from the received subset, and the at least one selection is played.

According to a further aspect of the present invention, an apparatus is provided for receiving adaptive streaming mechanism-based content. The apparatus includes a receiver for receiving a subset. The subset is configured by combining representations, which include content components into a group and combining at least two of the group, a representation, and a content component type into the subset. The apparatus also includes a controller for selecting at least one of a desired representation, a desired group, and a desired content component type from the received subset, and playing the at least one selection.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
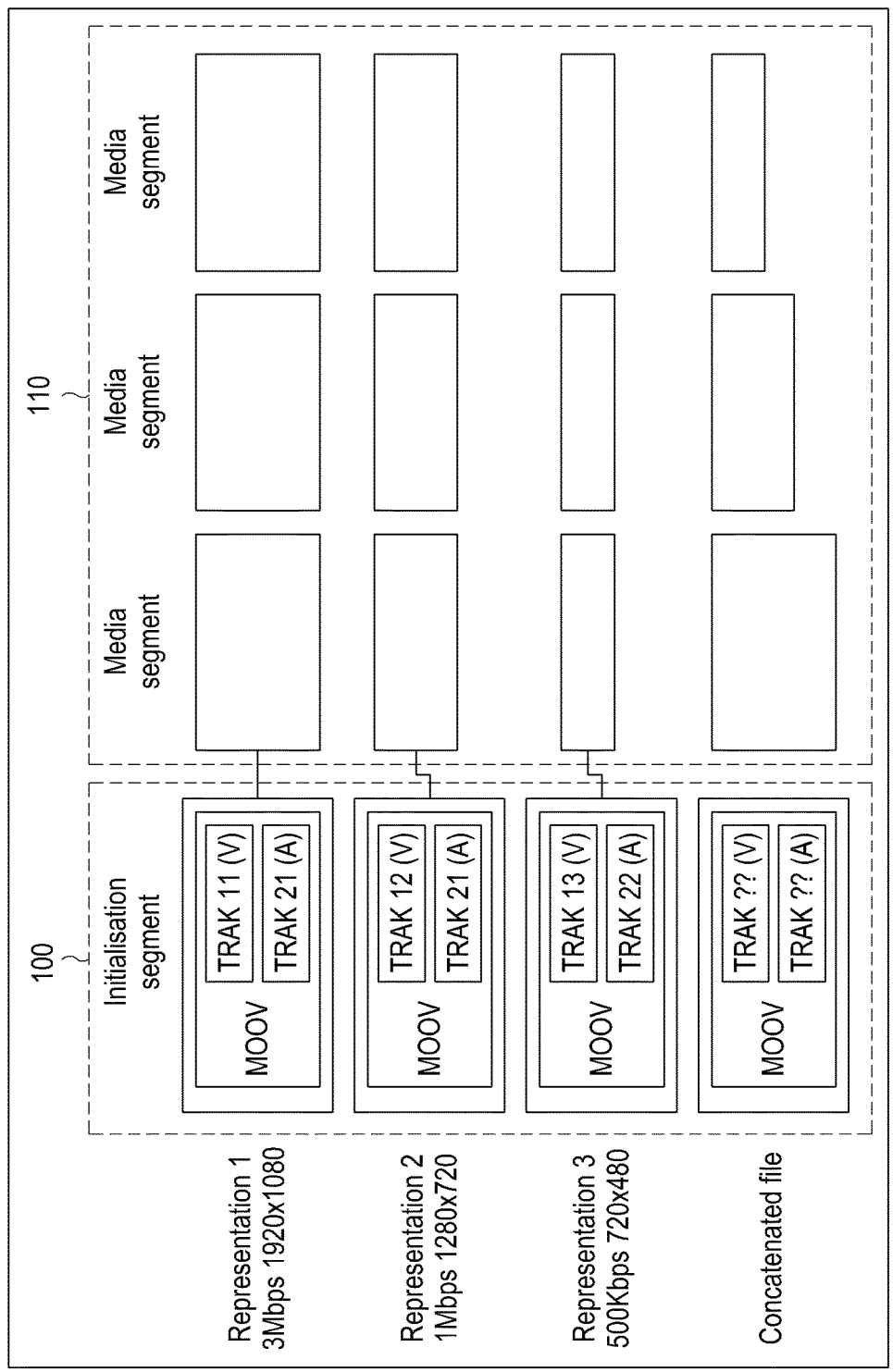
FIG. 1 is a diagram illustrating possible problems of initialization segments during storage of content in a $3^{rd}$ Generation Partnership Project (3GPP) HyperText Transfer Protocol (HTTP) Adaptive Streaming (HAS) system to which an embodiment of the present invention is applicable.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Although the names of entities defined in Open IPTV Forum (OIPF) will be used intact in the following description for convenience purpose only, they are not used to limit the scope of the present invention, and it will be understood by those of ordinary skill in the art that the present invention may be applied to any other systems having similar technical backgrounds.

Prior to a description of the present invention, the terms of 3GPP HAS, used in this specification, are defined below.

HAS: HTTP Adaptive Streaming

Content: creations such as movies, music, and news, and a storage form thereof

Content component: components (e.g., video, audio, caption, etc.) constituting content Representation: one representation form. Low-quality and high-quality representations may exist, but their contexts are the same.

3GPP HAS includes representations created by encoding the same content and content components with different conditions (i.e., different network bandwidths, resolutions, codecs, etc.), and an MPD, serving as a manifest file, configured by dividing the full length into several equivalent periods, re-dividing the periods into segments of a sufficiently short time of about 1 to 10 seconds (segmentation), and specifying file names, sequence numbers, start times, lengths, etc. of the segments.

The segment includes an initialization segment having information for decoder configuration provided to properly decode its associated representation, and media segments including segmented content components. A client first receives an MPD and checks which representation is included in it. Thereafter, the client determines performance and capability of the client device, a network speed, etc., selects a proper representation, downloads fragments thereof in sequence, and starts playing them.

If there is a change in mutable variables such as a network bandwidth, i.e., if the network speed increases, the client selects fragments of the representation created with a higher bandwidth, and plays the selected fragments. As a result, while the image quality may vary depending on the network speed, the playing may continue without being disconnected.

The requirements for the 3GPP HAS technology having the above characteristics, the problems thereof, and solutions thereto (i.e., embodiments of the present invention) are described in detail below.

With respect to 3GPP HAS content, proper segments may be selected from among the segments in multiple representations depending on conditions such as the network speed, and then played. The content can be stored by concatenating the selected segments in sequence. However, the representations may have different initialization segments, because they are created with different encoding options.

FIG. 1 is a diagram that illustrates possible problems of initialization segments during storage of content in a 3GPP HAS system to which an embodiment of the present invention is applicable.

Referring to FIG. 1, representations have different initialization segments as shown by reference numeral 100. In attaching received media segments 110 thereto for their storage, storing only one of the existing initialization segments is equivalent to losing the information used to play media segments of other presentations.

Accordingly, a first embodiment of the present invention provides methods for solving the possible problems which may occur when storing the 3GPP HAS content.

The first embodiment of the present invention may store media segments of different representations so as to be later replayed, in the following two ways.

In a first case, a client device may have an ISOFF reconfiguration feature.

In this case, the client device may reconfigure initialization segments of a new version through the following steps.

All initialization segments, or an initialization segment corresponding only to the representation, which is downloaded depending on conditions such as the network speed, are concatenated or merged in the following order;

Each initialization segment includes boxes such as 'styp' indicating that its type is a segment, and 'moov';

'trak' boxes are gathered in their 'moov' boxes to be merged;

track IDs of 'trak' boxes are substituted with new IDs if they overlap; and

Initialization segments are reconfigured and stored using 'moov' boxes, which are newly made by putting all 'trak' boxes in the 'moov' boxes.

If media segments are stored intact together with the reconfigured initialization segments, the following problems may occur. Specifically, 1) if track IDs overlap, track IDs may not be present in associated media segments because track IDs of 'trak" boxes in 'moov' boxes of the initialization segments were substituted at random, or 2) if track IDs of media segments are the same, the client device may not normally replay them since proper decoding configuration may not be applied thereto.

Therefore, the client device should reconfigure even media segments of a new version in accordance with the following steps.

After downloading media segments, the client device should change their track IDs depending on the substitution rule;

Each media segment includes boxes such as 'styp' indicating that its type is a segment, 'sidx', 'tfad', 'moof', 'mdat';

If there is a 'sidx' box for substitution, the client device opens it and substitutes its reference track ID;

For substitution, the client device opens a 'traf' box in a 'moof' box and substitutes its track ID; and The client device stores the media segments using the modified 'sidx' and 'moof' boxes.

If continuously stored or concatenated, the reconfigured initialization segments and media segments may be replayed later.

In a second case of the first embodiment, a client provider may consider storing content.

If the content provider provides initialization segments considering the possible situations where content may be stored in a client device, the client device may store segments intact without modification and replay them later.

The content provider configures track IDs for all representations so as not to overlap.

The content provider configures an initialization segment of each representation to have decoding configurations for content components in all other representations.

In addition, the content provider may configure an MPD so that all representations may indicate the same initialization segment.

Figure 2:
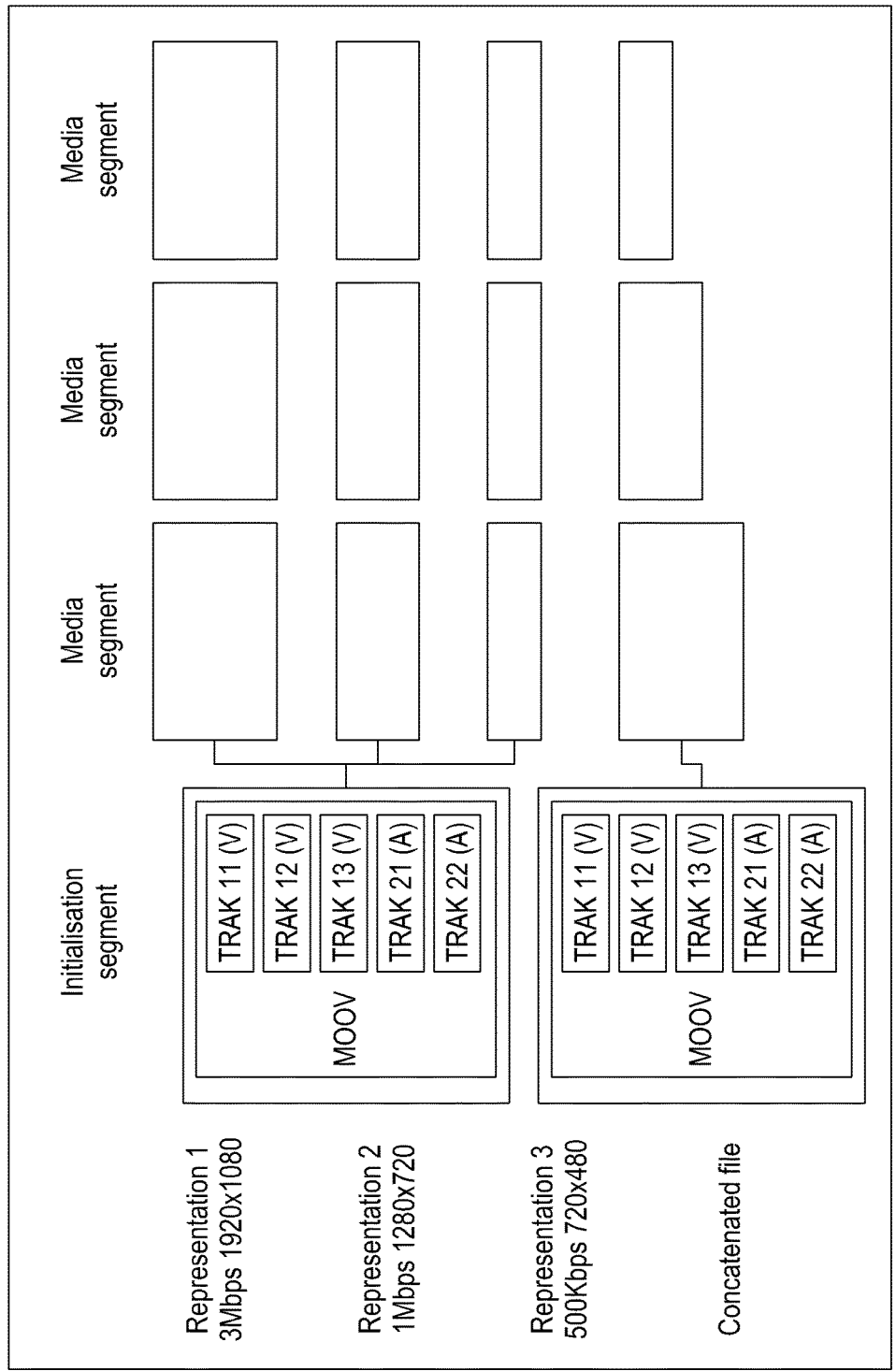
FIG. 2 is a diagram illustrating initialization segments reconfigured taking their storage into account, according to an embodiment of the present invention.

FIG. 2 illustrates initialization segments reconfigured according to the first embodiment of the present invention.

Accordingly, in 3GPP HAS, the following changes are required for an MPD and a file format.

MPD:
- All representations indicate the same initialization segment file;
- oipf:component is used to describe which content component is played when a representation is selected using the common initialization segment of the representations. It is used to further describe IDs and types of content components of each representation; and
- All oipf:components uses an existing optional ID attribute.

File Format:
- Initialization segments include information for decoding tracks of all representations. Therefore, all 'trak' boxes may be included in one 'moov' box; and
- track IDs are be unique; track IDs of different content components do not overlap.

3GPP HAS content may have configurations of combinations such as 'video+audio', 'video without audio', and 'audio without video', as representations are combined.

However, in the case where a client device makes its best effort depending on conditions such as the network speed, a content creator has no way to explicitly describe the combinations.

Figure 3:
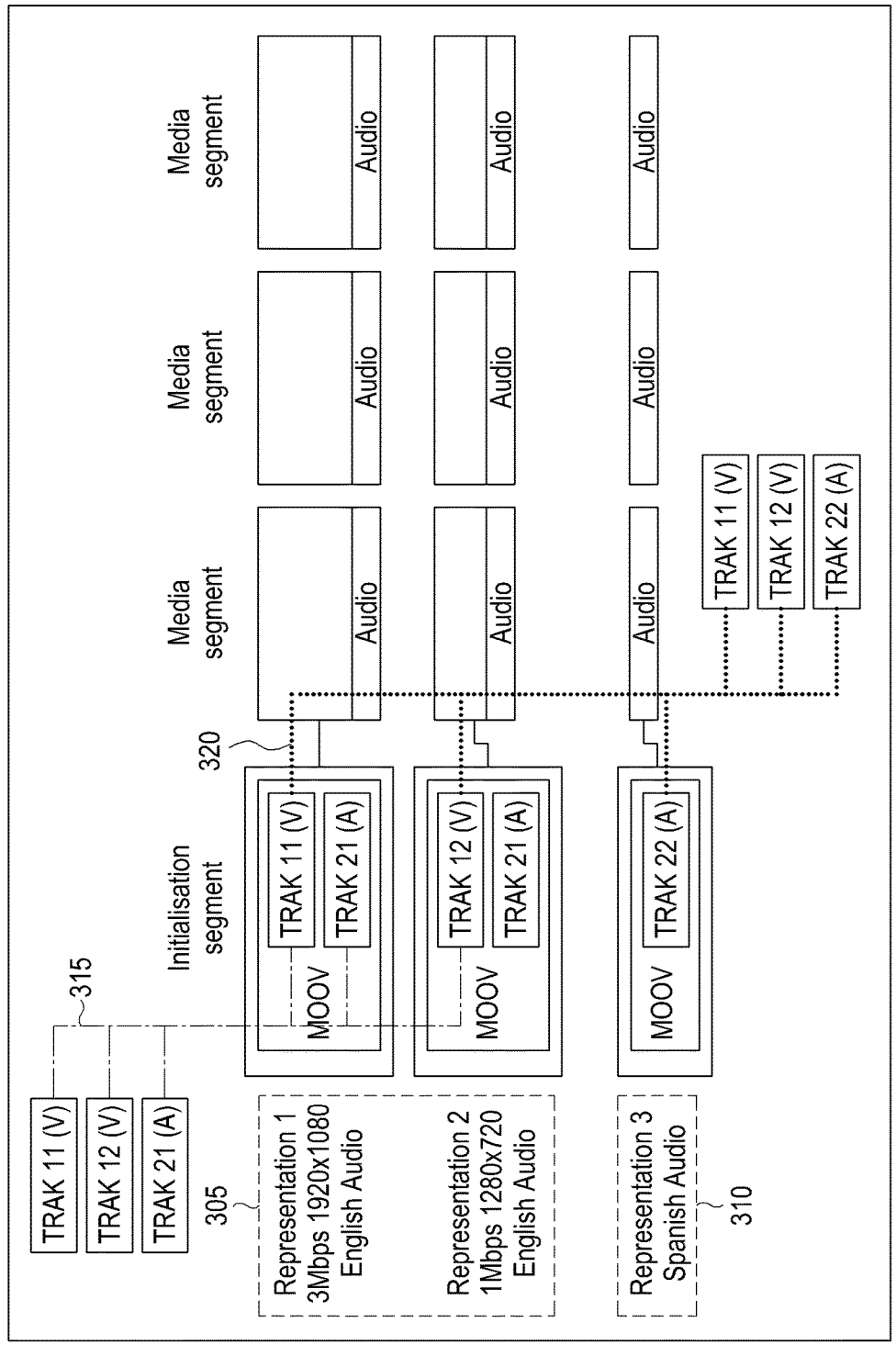
FIG. 3 is a diagram illustrating an example of service combinations available in multiple representations, according to an embodiment of the present invention.

FIG. 3 illustrates an example of service combinations available in multiple representations, according to a second embodiment of the present invention.

Referring to FIG. 3, when representations 305 exist, which are created in English and have different bit rates, and a Spanish audio track 310 exists separately, a content creator may enable several services such as 'video+English audio' 315 and 'video+Spanish audio' 320, by combining content components.

Accordingly, the second embodiment of the present invention provides a method in which a content creator may combine content components to enable several services.

In order to represent that a content creator may enable several services by combining content components, the second embodiment of the present invention defining services indicating combinations of a representation, content components in the representation, and groups (collections of representations), as shown in Table 1 below.

TABLE 1

```
<Services>
    <service ID="1" description="Movie (non-adaptive English version)">
        <representationInfo refID="1"/>   // high quality representation
    </service>
    <service ID="2" description="Movie (adaptive English version)">
        <groupInfo refID="1"/>   //alternateGroup of English Movie
    </service>
    <service ID="3" description="Movie (adaptive Spanish version)">
        <groupInfo refID="1" type="video"> //alternateGroup of video
        <representationInfo refID="3"/>   // Spanish audio
    </service>
    <service ID="4" description="Movie (non-adaptive Spanish version)">
        <componentInfo refID="11"/> // high quality video
        <representationInfo refID="3"/>   // Spanish audio
    </service>
```

TABLE 1-continued

```
</Services>
<Representation ID="1" group="1" bandwidth="6Mbps" ...>
    <SegmentInfo ...>
    ...
    <SegmentInfo>
    <oipf:Components>
        <oipf:component type="video" id="11">
        <oipf:component type="audio" id="21" >
    </oipf:Components>
</Representation>
<Representation ID="2" group="1" bandwidth="3Mbps" ...>
    <SegmentInfo ...>
    ...
    <SegmentInfo>
    <oipf:Components>
        <oipf:component type="video" id="12">
        <oipf:component type="audio" id="21" >
    </oipf:Components>
</Representation>
<Representation ID="3" group="2" bandwidth="1Mbps" ...>
    <SegmentInfo ...>
    ...
    <SegmentInfo>
    <oipf:Components>
        <oipf:component type="audio" id="22" >
    </oipf:Components>
</Representation>
```

In Table 1, 'Services' represents the presence of combinable services, and 'Service' represents each of the services. In Service, representation, group, content component, etc. are referenced, and if a type is specified for a group, it represents that only one content component type such as video and audio in the group is referenced.

Accordingly, the following changes are required in 3GPP HAS.

MPD:
- 'Period' has services as its elements;
- 'Services' has a service(s) as its element;
- 'Service' has an ID and a description as its attributes;
- 'Service' has representationInfo, groupInfo, componentInfo as it elements;
- 'RepresentationInfo' indicates a representation to be referenced by using refID as an attribute;
- 'GroupInfo' indicates a group to be referenced by using refID as an attribute;
- 'GroupInfo' indicates a content component type to be referenced in a group by using 'type' as an attribute;
- 'Representation' has ID added as an attribute; and
- If service elements are present, all representations should have their IDs.

This service information may exist in multiple locations such as an MPD or another MPD, and another segment file.

3GPP HAS uses an MPD for content delivery, but does not describe conversion from the stored format to the MPD. Therefore, all delivery-related information is in the MPD. There is no information for conversion to the delivery format if the MPD is not stored during storage. In addition, 3GPP HAS embeds an MPD or a link indicating the MPD in initialization segments during storage, but this is not mandatory.

Accordingly, a third embodiment of the present invention provides the following method of forcing an MPD to be embedded in initialization segments and performing conversion to the delivery format if the MPD is present.

- For conversion to the delivery format, information about representations is read from the MPD, and track information is read from a stored file;
- The stored file is divided on a segment basis depending on the track information, and stored in a file; and If the delivery format corresponds to a self-initialization segment, the MPD is updated by calculating an offset from its start point.

In the third embodiment of the present invention, the following change is required in 3GPP HAS.

MPD:

Initialization segments should have an MPD and its link embedded therein.

3GPP HAS does not described whether to store previously transmitted content components, a storage period thereof, and/or a method of indicating stored content components. In 3GPP HAS, a start attribute value specified in Period is applied to the entire representation (or a set of segments) in the Period. Representations have no separate time information, and segments have only duration values. When content is cached, it may be cached over the full Period, meaning that content components may not be used independently, or may not be reused.

Accordingly, in a fourth embodiment of the present invention, in order to play the previously transmitted content and the current content together, content components should be stored such that they may be reused later after a previous transmission. In addition, a duration or period should be specified, which indicates when the content components will be reused, and indicates whether they will be reused since then. In addition, components previously transmitted and stored in the local are instructed to be played together with the current components, and if no components are stored, an available link should be provided to a server as shown in Table 2 below.

TABLE 2

<Representation expirationUTC="2010-08-31" identifier="ABC123">
    <segmentInfo baseUrl="rep2/">
        <Url sourceUrl="seg1.3gp">
    </segmentInfo>
</Representation>

In Table 2, 'expirationUTC' represents an absolute time and indicates when this representation will be reused, and 'Identifier' is used as an identifier for distinguishing a stored representation.

Based on the above attributes, the client device may manage reusing the previously transmitted content components in the following order, storing the content components to reuse them later, and/or deleting expired content components.

In an MPD, expirationUTC is presented in Representation, Content component, Group, etc. as an attribute;

Using Identifier or URL of a segment as an identifier, the client device determines if the associated content components or individual files are stored in a storage unit connected to the client device;

The client device includes a step of determining whether an identifier is the same and a segment file's name is the same, or whether a part of a URL of a segment is equal to a part of a path of a stored file, or whether all or part of a file managed by a separate database is the same;

If all or part of a stored file is discovered, the client device plays the file;

If there is no stored file, a relevant file or a part of the file is received from a content server and then stored in a storage unit connected to the client device;

For storage, Identifier and/or base URL of a segment may be used as a part of a folder name or a file name;

To describe a storage period, a separate database may be used, or a storage period may be used as a folder name or a part of the folder name; and If the storage unit connected to the client device lacks empty space at the moment a new content component is to be stored, the client device deletes files whose valid period has expired, deletes files whose valid period has expired by searching the storage unit upon start up the client device, or deletes files corresponding to the time the valid period expires, by checking the database.

Accordingly, in the fourth embodiment of the present invention, the following changes are required in 3GPP HAS.

MPD:

When later replayed, representation should have expirationUTC and Identifier;

ExpirationUTC indicates the time the file stored to be later replayed may be deleted as it is no longer used; and Identifier represents an identifier used to reuse the same content component in different MPDs.

'Timed metadata' is meaningful at a specific time or for a specific period from the time. 3GPP HAS content is set to display its information such as a title and a copyright, in ProgramInformation.

However, ProgramInformation, or metadata corresponding to the entire MPD, is not timed metadata. In addition, it is not possible to specify the time the metadata is applied, or to specify a time period for which the metadata is applied.

Accordingly, a fifth embodiment of the present invention provides a method for applying timed metadata to both the MPD and the File Format. Since the MPD describes one or more Periods, in order to propose a time of timed metadata, Timed Metadata is newly established, and its start time, duration and metadata are described in Table 3 below. The Timed Metadata, an element capable of expanding content features, can realize a variety of effects by being inserted in various locations depending on the scene and the content features. For example, the Timed Metadata may describe media by being applied to a specific time in the time domain after being applied to a Period level. In addition, the Timed Metadata may realize other features depending on media attributes such as audio and video, by being included in a Representation level. The Timed Metadata may be included in a container containing actual content data except for the MPD. The features the Timed Metadata desires to realize may be described in the text, and for the features, a URL or a location in a media representation file the MPD desires to realize, may be referred to.

TABLE 3

<Period>
    <TimedMetadata startTime="00:00:10" duration="00:02:00">
        Car chase scene
    </TimedMetadata>
    <Representation>
    ...

Table 4 is an example in which timedMetadata is included in an MPD on a representation level, according to an embodiment of the present invention.

TABLE 4

...
  <Period start="PT0s">
    <Representation mimeType="video/isof">
      <timedMetadata startTime="PT10s" duration="PT60s">
        Car chase scene
      </timedMetadata>

TABLE 4-continued

```
        baseURL="rep2"/>
          <InitialisationSegmentURL sourceURL="seg-init.3gp"/>
          <Url sourceURL="seg-1.3gp"/>
          <Url sourceURL="seg-2.3gp"/>
          <Url sourceURL="seg-3.3gp"/>
        </SegmentInfo>
      </Representation>
      <Representation mimeType="audio/aac">
        <timedMetadata startTime="PT10s" duration="PT60s"
          sourceURL="meta.xml"/>
        <SegmentInfo duration="PT120s" baseURL="rep2"/>
          <InitialisationSegmentURL sourceURL="seg-init.3gp"/>
          <Url sourceURL="seg-1.3gp"/>
          <Url sourceURL="seg-2.3gp"/>
          <Url sourceURL="seg-3.3gp"/>
        </SegmentInfo>
      </Representation>
      ...
    </Period>
    ...
```

File Format proposes a new box as shown in Table 5 below, capable of inserting metadata in units of movie fragment in a segment. Table 6 is a description for Table 5.

TABLE 5

The Movie Fragment Meta box

Definition
Box Type:        'mfmt'
Container:       File, Movie Fragment Box ('moof'), Track Fragment
                 Box ('traf')
Mandatory:       No
Quantity:        Zero or one
Syntax
aligned(8) class MovieFragmentMetaBox (handler_type)
    extends FullBox('mfmt', version = 0, 0) {
    HandlerBox(handler_type)   theHandler;
}
aligned(8) class TimedMetaInfo extends FullBox('tmif', version, 0) {
    unsigned int(32)    entry_count;
    for (i=1; i<=entry_count; i++) {
        if (version == 0) {
            unsigned int(32)   item_ID;
            unsigned int(32)   reference_track_ID;
            int(32) mediaTime;
            unsigned int(32)   duration;
            string             item_name;
            string             content_type;
            string             content_encoding;  //optional
        }
        else { // version == 1
            unsigned int(64)   item_ID;
            unsigned int(64)   reference_track_ID;
            int(64) mediaTime;
            unsigned int(64)   duration;
            string             item_name;
            string             content_type;
            string             content_encoding;  //optional
        }
    }
}
```

TABLE 6

Semantics

The structure or format of the metadata is declared by the handler
entry_count counts the number of resources of timed metadata in
the following array.
item_ID is an arbitrary integer 'name' for this resource which can be
used to refer to it (e.g. in a URL).
reference_track_ID provides the track_ID for the reference track
media_time is an integer containing the starting time of this timed
metadata is present (composition time)

TABLE 6-continued

Semantics duration is an integer that declares length of the presentation
(in the indicated timescale).
item_name is a null-terminated string in UTF-8 characters containing
a symbolic name of the item.
content_type is a null-terminated string in UTF-8 characters with
the MIME type of the item. If the item is content encoded (see below),
then the content type refers to the item after content decoding.
content_encoding is an optional null-terminated string in UTF-8
characters used to indicate that the binary file is encoded and needs
to be decoded before interpreted. The values are as defined for
Content-Encoding for HTTP/1.1. Some possible values are "gzip",
"compress" and "deflate". An empty string indicates no content
encoding. Note that the item is stored after the content encoding has
been applied.

3GPP HAS realizes Live streaming by splitting content on a period basis and a segment basis, providing an MPD describing the segments, and allowing the client device to constantly update the MPD at regular intervals and transmit segment files of the next play period. However, when the client device pauses play, since a valid period of the segments the MPD currently describes is bound with the valid period of the MPD, if the MPD is updated with new information, the previously described segments are no longer available in the server. In addition, when the client device attempts time-shifted play back to the previous time, if segment information for the time is not present in the MPD, the client device may not know a name and availability of the segment file associated with the time. In addition, a server for delivering Live content does not guarantee storage of past segments except for the current information in order to ensure real-time performance. However, a CoD server is mainly used to provide more content than real-time content.

Figure 4:
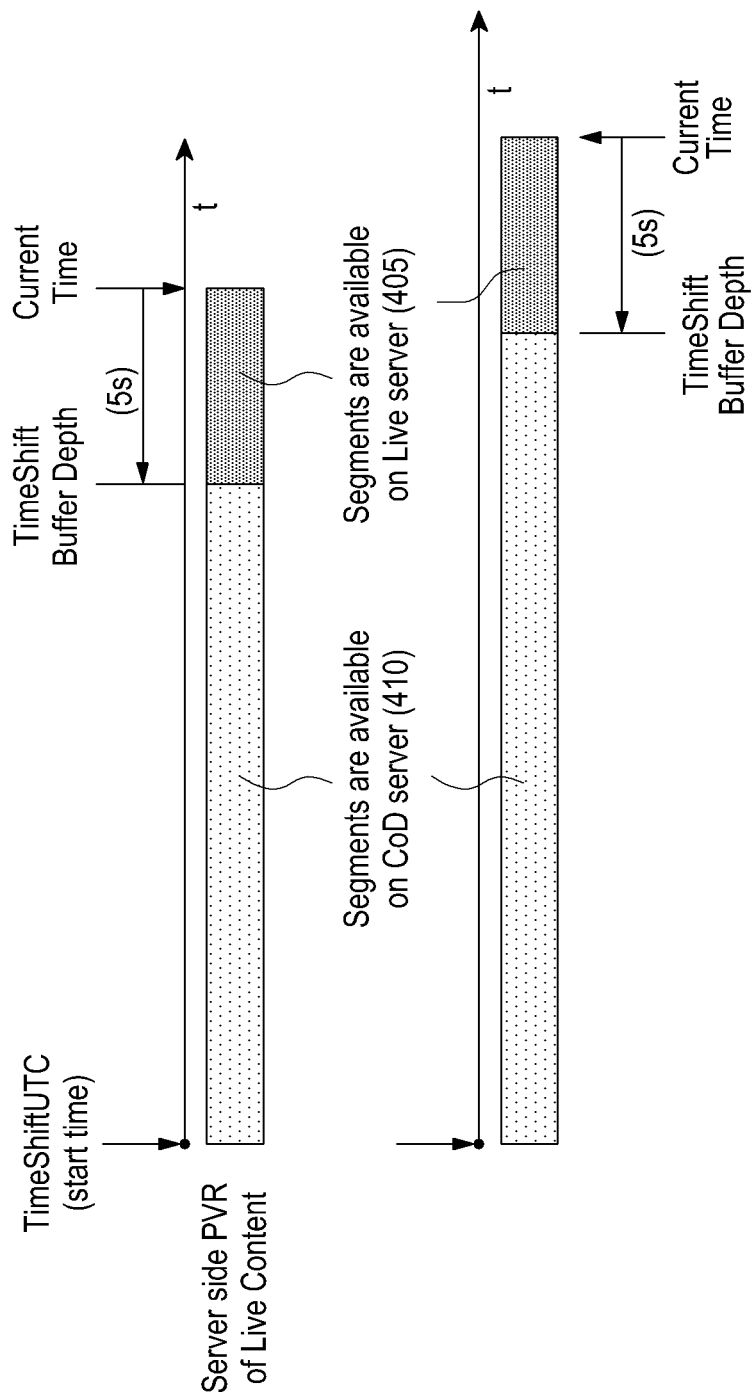
FIG. 4 is a diagram illustrating an example of configuring a segment to be available in a Content on Demand (CoD) server after a time timeShiftBufferDepth a Multimedia Presentation Description (MPD) uses to indicate a valid period of the segment of Live content, according to an embodiment of the present invention.

FIG. 4 illustrates an example of configuring a segment to be available in a CoD server after a time timeShiftBufferDepth an MPD uses to indicate a valid period of the segment of Live content, according to a sixth embodiment of the present invention.

Referring to FIG. 4, if periods are specified separately and segments associated with the periods are transmitted by Live and CoD servers, a period 405 may be received from the Live server and a period 410 may be received from the CoD server.

The period 405 of Live content shifts over time.

If a play time shifts to the period 410 by Pause or time-shift, the client device receives segment files using a URL for the CoD server.

An MPD is configured as shown in Table 7 below.

TABLE 7

```
<MPD timeshiftbufferdepth="PT5S"
     availableStartTime="2010-08-31"
     timeshiftUTC="2010-08-31"
     baseUrl="HTTP://www.foo.com/live"
     basePvrUrl="HTTP://www.foo.com/cod">
```

Accordingly, in the sixth embodiment of the present invention, the following changes are required in 3GPP HAS.
MPD:
  timeshiftUTC and basePvrUrl are added in the MPD as attributes;
  timeshiftUTC indicates content from which time in a program is available on the CoD server; and basePvrURL indicates a base URL used to receive segments from the CoD server.

3GPP HAS may make random access to CoD content using MFRA of ISOFF, but Live content has no information for random access. In addition, 3GPP HAS has proposed a 'sidx' box for segment-continued play during switching of play representations. However, the 'sidx' box has insufficient information for random access as it has information about only one random access point per one movie fragment (normally, having 2-3 seconds).

Accordingly, a seventh embodiment of the present invention provides a method with the following steps.

The 'sidx' box is expanded to indicate all Random Access Points (RAPs) in movie fragments;
A start point and an end point of a sample corresponding to a RAP are specified to make it possible to receive the RAP by request without parsing a 'moot' box; and
Due to the change, the client device may start play beginning from a more accurate random access point after parsing the 'sidx' box.

The client device may use the 'sidx' box for trick play. To this end, the following method steps are provided.

The client device receives the 'sidx' box from a segment of a representation it will play;
The client device receives a random access point list for the 'sidx' box, and determines which random access point it will play, depending on the speed of a trick mode; and
The client device receives and plays only the necessary samples using the start point and end point of samples of the determined random access points.

Accordingly, in the seventh embodiment of the present invention, the following changes of Table 8 below are required in 3GPP HAS.

TABLE 8

Syntax of 'sidx':

```
aligned(8) class SegmentIndexBox extends FullBox('sidx', version, 0) {
    unsigned int(32) reference_track_ID;
    unsigned int(16) track_count;
    unsigned int(16) reference_count;
    for (i=1; i<= track_count; i++)
    {
        unsigned int(32) track_ID;
        if (version==0)
        {
            unsigned int(32) decoding_time;
        } else
        {
            unsigned int(64) decoding_time;
        }
    }
    for(i=1; i <= reference_count; i++)
    {
        bit (1)            reference_type;
        unsigned int(31)   reference_offset;
        unsigned int(32)   subsegment_duration;
        bit(1)   contains_RAP;
        unsigned int(31)   rap_count; //added
        for(j=1;j<=rap_count;j++) //added
        {
            unsigned(32)   RAP_delta_time; //moved
            unsigned(32)   Sample_start_offset; //added
            unsigned(32)   Sample_end_offset; //added
        }
    }
}
```

In 3GPP HAS, Live describes only a part of the entire content, as a part of an MPD is updated at regular intervals. However, in case of CoD, as it contains information about all parts of content, the client device receives unnecessary information to determine one segment required to start play.

Accordingly, an eighth embodiment of the present invention provides the following methods.

A method is provided for distributing information in an MPD and indicating them in accordance with the steps below.

The MPD includes an MPD describing a Period including one or small segment containing information for initial execution, and one or more MPDs obtained by dividing the following time into periods;
The MPD is embedded in a separate file or segment (MPD segment);
The MPD segment is a media segment having an MPD in an 'mfmt' box; and
Each MPD indicates a link of the next MPD, or a link of an embedded segment.

Accordingly, in the eighth embodiment of the present invention, the following changes are required in 3GPP HAS.

MPD:
    MPDSegmentURL is added in SegmentInfo as an element; and
    MPDSegmentURL has sourceURL and range as its attributes.
File Format:
    The MPD segment is a media segment having an MPD in an 'mtmt' box.

Although bandwidth, width, height, lang, mimetype, qualityranking, etc. have been considered for interactive selection, views have not been considered. Views of multi-views may be different only in location and number on the condition that different attributes such as bandwidth have the same value.

As for multi-view content, view selection is impossible because the client device may not determine which view it receives, based on only the information provided from the current representation.

There are many different types of relationships among views.

For multi-views, view corresponds to a relationship that at least one of them may be selected at random and displayed.

In 3D stereoscopic, Left and Right Views correspond to a relationship that they should be played together.

In case of Scalable Video Coding (SVC), if there is a layer relationship such as a base layer and an enhanced layer, it corresponds to a relationship that the base layer is selected, and then, the other enhanced layer may be selected in sequence.

Therefore, an attribute name such as relationship is proper, compared with view.

In a first method, an explicit description of relationships is provided below.
Relationships:
relationship="stereoscopic/L"
relationship="stereoscopic/R" or
relationship="multiview/1"
relationship="multiview/2"
relationship="multiview/3" or
relationship="svc/base"
relationship="svc/enhanced1"
relationship="svc/enhnaced2"

In a second method, a description of connections associated with relationships is provided below.
Relationships:
relationship="one or more" or
relationship="all" or
relationship="incremental/1"

Accordingly, in a ninth embodiment of the present invention, the following changes are required in 3GPP HAS.

MPD:
Representation has relationship as an attribute; and
Relationship is configured in accordance with Method 1) and Method 2).

In 3GPP HAS, since representation is "one of the alternative choices of the media content", information providing the selection criteria for choices includes the following attributes of representations:
1) Bandwidth: Bandwidth attribute
2) Display size: Width and height attribute
3) Language: lang attribute
4) Prioritization: QualityRanking attribute However, there is no proposed method capable of determining priorities of Representations with a QualityRanking attribute and Representations without a QualityRanking attribute.

Accordingly, a tenth embodiment of the present invention provides a method having the following steps.
For alternate selection in a group, QualityRanking is inserted into all Representations, or not inserted into all Representations;
For priorities of groups, a low group id is indicated to have high priority; and
These priorities may be represented by separate attributes.

3GPP HAS provides attributes for describing differences between representations, but it does not indicate initial selection values and default values.

Accordingly, an eleventh embodiment of the present invention provides a method having the following steps.
A value indicating initial selection is attached to one of Representations having a relationship of AlternateGroup;
Default is added as an attribute of Representation;
A value indicating initial selection is attached to one of Services; and
Default is added as an attribute of Service.

As is apparent from the foregoing description, according to embodiments of the present invention, streaming broadcast content may be adaptively delivered in a digital broadcasting system.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for receiving a content using an adaptive streaming mechanism by a receiver, the method comprising the steps of:
receiving from a transmitter, by the receiver, a media presentation description including a period element that the period element includes information of a subset of the content, the subset including at least one group; and
identifying, by the receiver, the subset,
wherein the at least one group includes at least one representation for the content,
wherein each of the at least one representation has a different property for the content.

2. The method of claim 1, wherein the subset includes an indicator indicating group information.

3. The method of claim 1, wherein each representation included in the at least one group comprises information of a segment for the content.

4. The method of claim 1, wherein the property is identified by a bit rate of the content.

* * * * *